(No Model.)
3 Sheets—Sheet 1.
J. PATTEN.
APPARATUS FOR RAISING WATER THROUGH SIPHON PIPES.
No. 265,630. Patented Oct. 10, 1882.
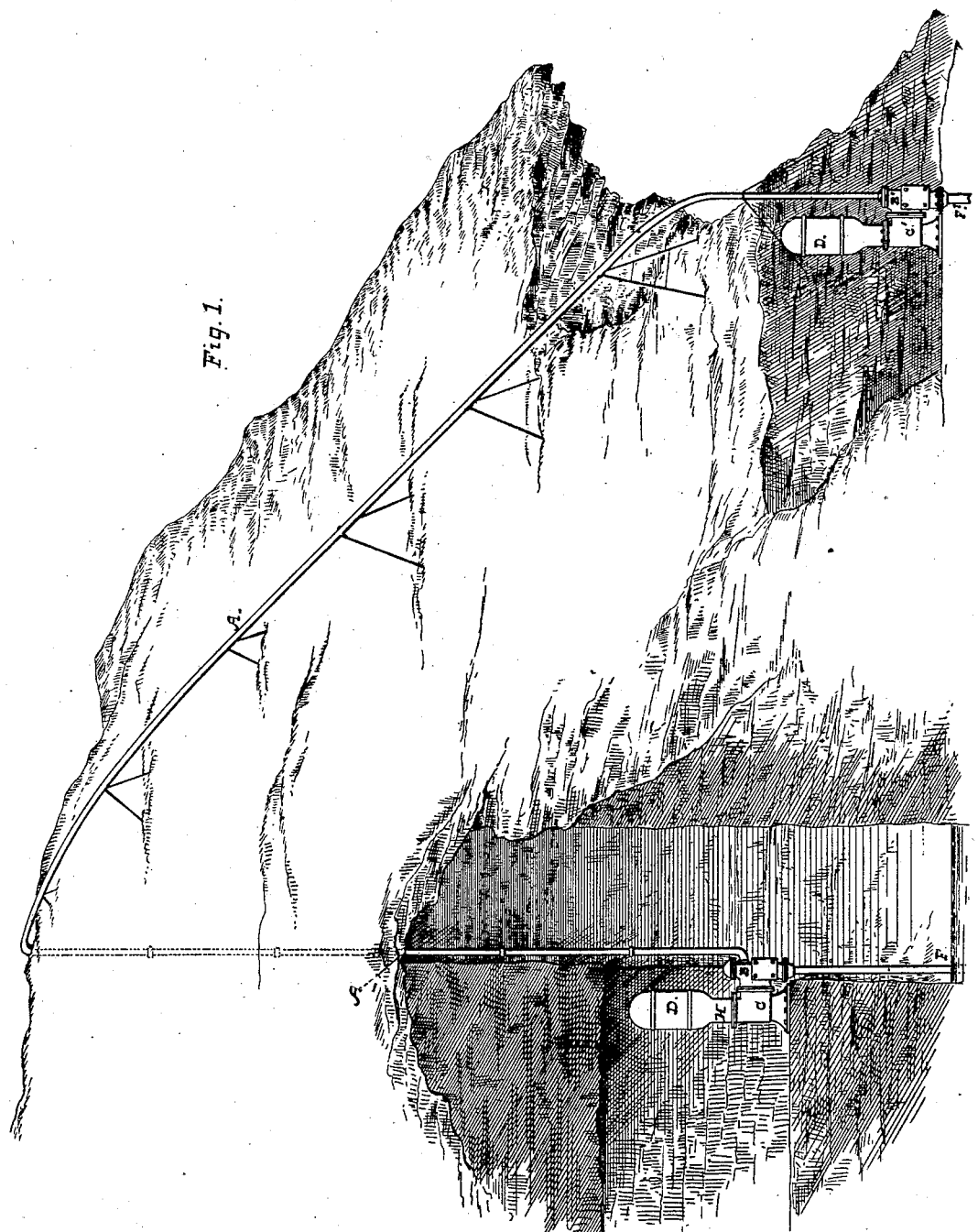
Witnesses:
W. Voit.
W. F. Clark
Inventor:
John Patten
By his Attys.,
Boone & Osborn

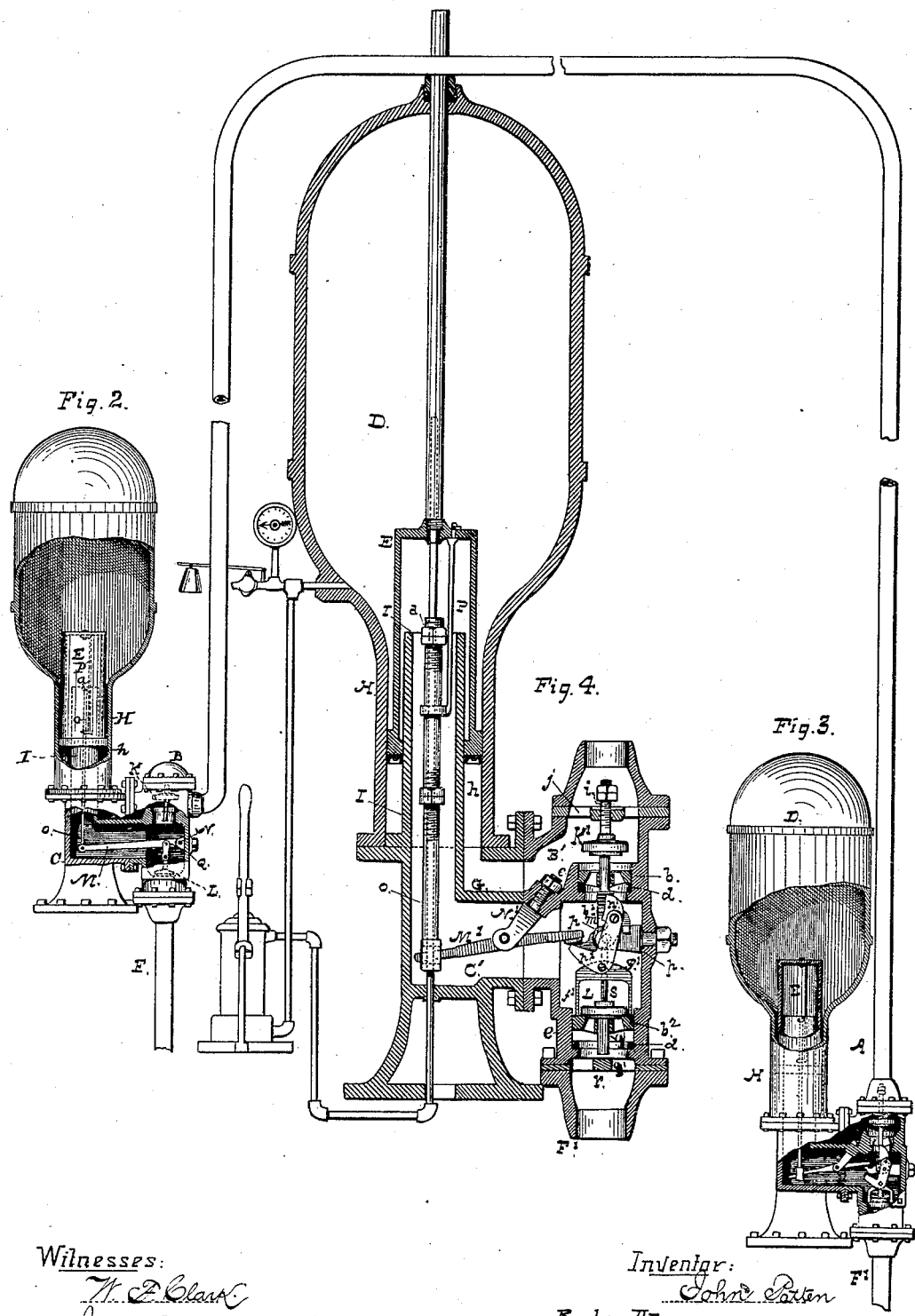

(No Model.) 3 Sheets—Sheet 3.
J. PATTEN.
APPARATUS FOR RAISING WATER THROUGH SIPHON PIPES.
No. 265,630. Patented Oct. 10, 1882.
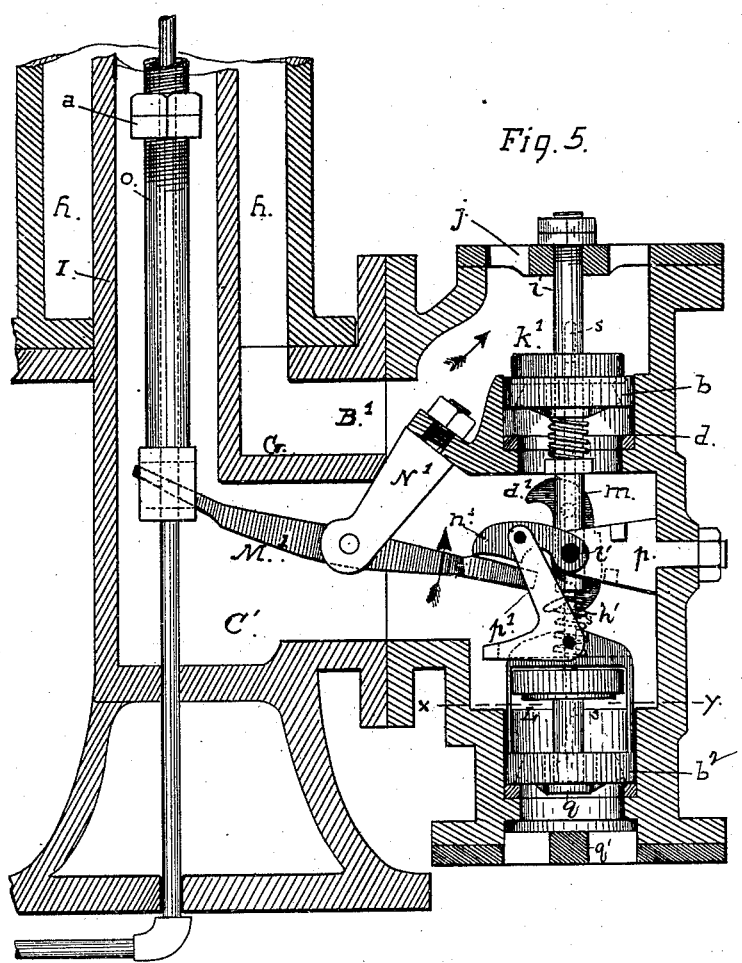
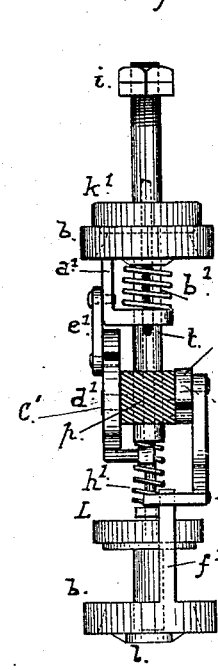
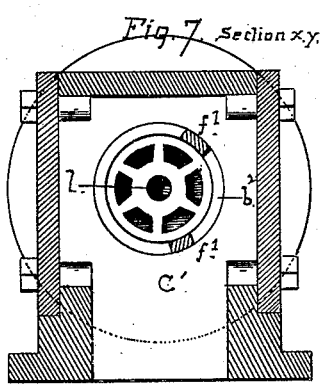
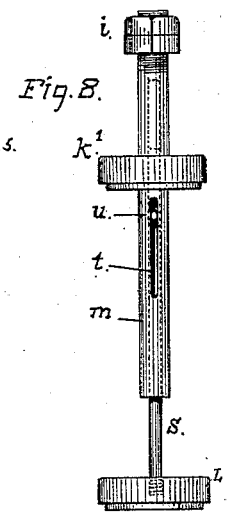
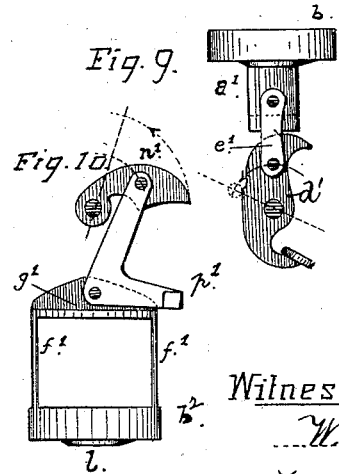
Witnesses:
W. Voit.
Wm. F. Clark
Inventor:
John Patten,
by his Attys,
Boone & Osburn
N. PETERS, Photo-Lithographer, Washington, D. C.

UNITED STATES PATENT OFFICE.

JOHN PATTEN, OF SAN FRANCISCO, CALIFORNIA.

APPARATUS FOR RAISING WATER THROUGH SIPHON-PIPES.

SPECIFICATION forming part of Letters Patent No. 265,630, dated October 10, 1882.

Application filed June 13, 1881. (No model.)

*To all whom it may concern:*

Be it known that I, JOHN PATTEN, of the city and county of San Francisco, in the State of California, have invented an Improvement in Apparatus for Raising Water through Siphon-Pipes of Unlimited Height; and I do hereby declare that the following is a full, clear, and exact description thereof, reference being had to the accompanying drawings.

My invention relates to an improved method and apparatus for raising water through a pipe, and either discharging it on a higher level or conducting it through a siphon-pipe of unlimited height and discharging it on a lower level by the action and reaction of the column of water acting upon or against a body of air contained in an air-chamber at each end of the pipe, and suitable valved passages, chambers, and connections, to be hereinafter described. In each form of my pumping apparatus I interpose a piston between the column of water and the air in the air-chamber, so that the air-pressure is independent of the water-pressure in the column and water-chambers. The lower end of the water-pipe connects with the upper one of the two chambers, one of which may form the suction-chamber and the other the discharge-chamber. The air-chamber is mounted above the upper chamber, and both chambers have passages leading into them, over which the piston is placed, so that the water-pressure against its under side is divided between the two water-chambers, so that the pressure of the water in both chambers can be exerted against it in order to raise the piston and compress the air in the air-chamber. This is what I call a "hydropneumatic" pump. My present application refers to the arrangement for raising water through a siphon-pipe of unlimited height and discharging it on a lower level than that from which it is taken, although it contains, in part, the mechanism and principle embodied in my pump or water-lifter for raising water and discharging it on a higher level. These last-mentioned water-lifters I have made the subject of a separate application. My unlimited siphon is adapted for raising water from mines and other great depths, where one leg of the siphon can extend down into the mine to near the water-surface, while the other or outside leg can be led to a lower point on the outside of the mine. To the lower end of each leg I then attach one of my hydropneumatic pumps above mentioned, so that the intermittent and alternate action and reaction of the column of water and the compressed air in the air chamber will cause the water to be raised and forced through the pipe and discharged on the outside of the mine, all as hereinafter more fully described.

Referring to the accompanying drawings, Figure 1 is a view showing my invention as applied to raising and pumping water to the surface by the shaft in the mine. Fig. 2 is a view partly in section of the engine located in the shaft. Fig. 3 is a view of the engine situated outside at the lower end of the siphon-pipe. Fig. 4 is an enlarged section of Fig. 3, showing the means by which the engine is charged with air at the beginning of its operation. Fig. 5 is an enlarged detail view of the valve mechanism. Fig. 6 is a detail view of the valve and valve-seat and their operating toggles or links. Fig. 7 is a horizontal section through $x\ y$, Fig. 5. Fig. 8 shows the manner by which the two valves are connected. Figs. 9 and 10 are details of the valve-seats.

Let A represent a siphon or bent pipe of any desired height, one leg of which extends down to near the water-surface in the mine, while the other or opposite leg extends to a lower level on the outside of the mine. To the lower end of each leg I connect one of my hydropneumatic pumps. Each pump consists of two water-chambers, B C, an air-chamber, D, a piston, E, and a valve mechanism which is operated by the movement of the piston. These two pumps are counterparts of each other, with the exception of the valve mechanism. I will therefore first describe the pump at the suction end of the pipe, and then describe the pump at the opposite or outer end, in connection with its peculiar valve mechanism. Beginning, therefore, with the pump in the mine, the lower end of the pipe A connects with its upper water-chamber, B, at one end of the pump, while the suction-pipe F, through which the water is drawn into the pump, is connected with the lower chamber directly below the pipe A, and extends down into the body of water which is to be lifted by the machine. The water-chambers will then extend out on one side of the pipe A, and the air-chamber D is placed above them, at their outer or opposite ends, and is connected with the upper chamber by a short vertical tube or cylinder, H, as shown.

G is the partition that separates the two water-chambers horizontally. The outer end of the lower or suction chamber has a vertical tube, I, extending upward into the short cylinder or neck H of the air-chamber. This tube is smaller than the neck H, so as to leave an annular space, $h$, between it and the outside cylinder or neck, which space communicates with the upper water-chamber, B. The upper end of this tube I is left open and an inverted-cup-shaped piston, E, placed over it. The lower rim of this piston E fits in the annular space $h$ between the tube I and the cylinder or neck H, and forms an annular piston, which is acted against by the pressure in the upper water-chamber, B, while the water in the lower chamber, C, rises in the tube I and acts against the top of the inverted piston on its under side. Below the pipe A is an opening in the partition G, closed by an upward-lifting valve, K, (see Fig. 2,) through which communication is had between the two chambers. This valve is drawn to its seat by any suitable means, (not shown,) such as a spiral spring, which may surround its guide-spindle. An upward-lifting valve, L, is also arranged to close the upper end of the suction-pipe F, and this valve is operated by the piston E in the following manner:

A lever, M, has one end pivoted to a lug, N, (see Fig. 2,) on the inside of the lower water-chamber, C, at a short distance above the valve L, and this lever extends horizontally through the chamber, passing above the valve L, so that its opposite end is below the center of the tube I.

A vertical rod, $o$, extends upward through the center of the tube I, and has its lower end connected to the end of this lever, while its upper end extends to near the top of the tube I, and has an adjustable head or enlargement, $a$, Fig. 5, on it.

A rod, P, has its upper end secured to the top of the piston E, and it extends down along the rod $o$ a short distance, and its lower end is bent to one side and clasped around the rod loosely, so that when the piston E moves upward the bent portion or clasp will move freely along the rod until it strikes the head or enlargement on the upper end of the rod, when it will lift the rod and outer end of the lever M upward. (See Fig. 2.) The valve L is connected with the lever M by a link, Q, so that when the lever is raised it lifts the valve from its seat. (See Fig. 2.)

This completes the mechanical description of the pump at the suction end of the pipe A, and it only differs from the pump at the outer or discharge end of the pipe in the construction, arrangement, and method of operating the valves.

In the engine above described water is drawn upward through the suction-pipe F into the lower chamber, C, when the piston E moves upward and is forced from the chamber C up through the passage governed by the valve K in the partition G, and thence upward through the pipe A, where the piston descends, while in the pump, at the opposite or outside end of the siphon-pipe, the water descends into both the upper chamber, B, and the lower chamber, C, and exerts its pressure to raise the piston by acting against the under side of the piston in both chambers. The upper valve is then closed and the lower one opened, so that the water in the lower chamber is discharged downward through the discharge-pipe F', which is the counterpart of the suction-pipe F of the suction-pump, while the water in the upper chamber is forced upward through the pipe A by the descending piston. It therefore necessitates a peculiar arrangement of the valves in this pump in order to open and close the passages at proper intervals. The construction and arrangement of these valves and the means for operating them are shown more distinctly at Figs. 3 and 4, Sheet 2. As in the case of the first-described pump, the two passages through which the water is received into and discharged from the lower chamber are in line with each other—that is, one is directly above the other—and both are in line with the water-pipe A. Each of the valves in this pump has a movable seat, $b$, arranged to move between it and a fixed seat, $d$. The fixed seat $d$ is formed on the lower projecting edge of a short tube, $e$, while the movable seat moves up and down in the tube above it, so that a tight joint is preserved between the outer edge of the movable seat and the tube in each position it assumes.

The upper valve, K', Fig. 4, has a guide-spindle, $i$, extending upward from its center and passing through a hole in the cross-bar $j$ above it. A tube, $m$, has its upper end connected with the center of the valve on its under side, and this tube extends down through the central hub, $l$, (see Fig. 7 for enlarged view,) of the movable valve-seat, and thence down on the arm or bracket $p$, that is fixed to and projects from the side of the chamber. The tube extends a short distance below the lower valve, L. This lower valve, L, has a short spindle, $q$, extending downward from its center, which rests upon a step or cross-bar, $q'$, when the valve is down. A rod, $s$, extends upward from the center of this valve and passes up into and through the tube $m$ to near its upper end. A vertical slot, $t$, (see Fig. 8,) is made in each side of the tube $m$, so as to extend above and below the end of the rod $s$. A keyway is made through the upper end of the rod, and a key, $u$, is inserted through the slot into the keyway, so that the ends of the key project through the slots and serve to limit the longitudinal movement of the rod in the tube. A bar, $a'$, extends downward from the central hub, $l$, of the upper movable seat, $b$, and its lower end is bent at right angles, so as to clasp the tube loosely a short distance below the key $u$, as shown in Fig. 6. A spiral spring, $b'$, encircles the tube $m$ between the key $u$ and lower end of the bar $a'$. A short journal, $c'$, is formed on the side of the bracket $p$, on which a lever or trip-bar, $d'$, is journaled, near its middle. The end of this lever which projects to the rear is connected with the bar $a'$ by means of a link, $e'$, thus forming a toggle-lever, which is operated by pressure applied upon or against the forward-projecting curved end of the lever $a'$, so that when the curved end of the lever is depressed the toggle is straightened and the valve-seat of the upper valve is raised to a position midway between its fixed seat and the upper valve, $K'$, at the same time compressing the spring $b'$. The movable valve-seat $b^2$ of the lower valve, L, is connected by upward-projecting arms $f'$ with a cross-bar, $g'$, through the middle of which the rod $s$ passes at a short distance below the lower end of the tube $m$. A spiral spring, $h'$, encircles the rod between the lower end of the tube and the cross-bar. The bracket $p$ has a short journal, $i'$, corresponding to the short journal $c'$ on its opposite side, on which one end of a short link, $n'$, is pivoted. The opposite end of this link or dog $n'$, Fig. 10, is connected with a link, $p'$, which is itself pivoted to the cross-bar $g'$ of the lower valve-seat, L, as shown, thus forming a toggle-lever, which raises the valve-seat when the toggle is straightened, and allowing it to drop when the toggle is broken. The lower end of the link $p'$ is curved forward in the same manner as the upper lever, $d'$, is curved.

The operating-lever M', which is moved by the motion of the piston E, is pivoted, in this instance at its middle, to the end of a downward-projecting lug or arm, N', so that its outer end moves up and down and trips the toggle-levers $d'$ and $n'$ as it successively comes in contact with them.

I will now describe the operation of this pump as the water enters it from the upright pipe A.

The air-pressure in the air-chamber of this pump is somewhat less than the pressure of the water in the two chambers B' C', so that when the pressure of the column of water is exerted upon the under side of the piston in both water-chambers the piston is forced upward; but when the upper valve, K', is closed and the lower valve, L, is opened, after the piston has been raised, the water in the lower chamber is exhausted through the discharge-pipe, thereby reducing the area of the water-pressure against the under side of the piston, so that the pressure in the air-chamber forces the piston down and drives the water in the upper chamber up the pipe A. When the water descends through the pipe A the valves and their movable seats will be in the position shown at Fig. 4—that is, the upper valve will be open, while the movable valve-seat of the lower valve will be raised, and the lower valve will rest upon it. The water will then fill both the water-chambers and force the piston upward. As it rises the rear end of the lever $m'$ will first come in contact with the upper trip-lever, $d'$, and straighten the toggle-levers, whereby the upper valve-seat, $b$, is raised to its intermediate position, thus partially closing the passage, but not entirely. The lever $m'$ next strikes the lower trip-lever, $p'$, and breaks the lower toggle, so that the movable valve-seat $b'$ is dropped to its lowest position on its fixed valve-seat, thus opening the lower passage into the discharge-pipe, so that the water in the lower chamber will begin to escape. As soon as the movable valve-seat of the lower valve is dropped the two valves will also drop until the lower end of the downward-projecting spindle $q$ of the lower valve rests upon the trip or cross bar $q'$. This dropping of the valves causes the upper valve to seat itself on the elevated movable seat, and thus close the passage between the two chambers B' C', but leaves the lower valve open, so that the water in the lower chamber continues to escape, while the pressure in the air-chamber drives the piston down and forces a portion of the water in the upper chamber up the pipe A. As the piston descends the lever M trips the levers $n'$ $p'$, so as to raise the movable seat of the lower valve and close the passage into the discharge-pipe, which it will readily do, as the water in the lower chamber has been exhausted, and then it will trip the upper lever, $d'$, so as to drop the upper movable valve-seat and open the passage between the two chambers, so that they can fill again, and thus continue the operation above described. After the upper movable valve-seat has been dropped and the water-pressure equalized on both sides of the upper piston the pressure of the spring $b'$ will readily raise the upper valve the short distance necessary to close it upon the movable seat, when the two valves drop simultaneously. The construction and arrangement of these valves and their method of operation are such that they can be easily operated without regard to the pressure upon them.

Having thus described the construction and operation of the two pumps employed at the opposite ends of my unlimited siphon, I will now describe the operation of producing a transfer of the water from one leg of the siphon-pipe to the other and discharging it on the lower level.

Taking the illustration of a mine heretofore mentioned, and supposing that one leg of the siphon-pipe extends down into the mine and the suction and force pump is connected with its lower end, so that the suction-pipe enters the body of water to be raised, and supposing that the opposite leg of the siphon-pipe extends on the outside of the mine to a lower level and has its receiving and discharging pump connected with its lower end, as heretofore described, I proceed to pump air into the air-chamber of the suction and force pump until the air-pressure upon the piston exceeds the water-pressure which is exerted against its under side by the water in the water-column when exerted upon the full area of the piston through both water-chambers. I then pump air into the air-chamber of the opposite or outer leg of the siphon until the air-pressure is almost equal to the water-pressure in the outside leg of the pipe A when exerted against the under side of the piston through both water-chambers, at the same time exhausting the air from underneath the piston by an arrangement of pipes shown at Figs. 4 and 5, by which the same pump exhausts the air from the lower water-chamber and transfers it to the air-chamber. The area of the annular piston being smaller than the area of the air-cylinder, the air-pressure will then be sufficient to force the water upward in the column when the upper valve is closed and the water has been discharged from the lower chamber; but when the lower valve is closed and the upper valve is open the pressure of the column will act against the under side of the piston in both chambers, and thus force the piston upward and compress the air in the air-chamber. Now, both of the air-chambers being charged, as stated, and the water being discharged from the lower chamber of the outer or discharge pump, the piston of the suction or inner pump will be raised and the piston of the outer or discharge pump will be down; but the upper valve of the outside pump will be opened and the lower or discharge valve closed. This will admit the water from the column to the lower chamber, and, as a consequence, the increased area of pressure against the under side of the outer piston will force it upward at the same time the piston at the opposite or suction end of the siphon moves downward. The downward movement of the latter piston forces the water in the lower chamber upward through the siphon, so that a portion of the column of water is transferred from the inner to the outer leg of the siphon-pipe. The upward movement of the outer piston opens the lower valve and closes the upper valve in the manner heretofore described, so that the pressure of the water against the portion of the piston connecting with the lower chamber is cut off, and the air-pressure in the air-chamber forces the piston down, transferring sufficient pressure through the pipe A to the opposite leg of the siphon to raise the opposite or inner piston by the pressure on the annular rim, thus drawing the lower chamber full of water by suction from the well or pump into which the suction-pipe extends. This action is thus repeated continuously and automatically, the water being alternately raised and forced upward through the pipe A by the action of the inner piston, so as to transfer a portion of the water to the outer leg of the siphon, while the outer pump alternately discharges the water from its lower chamber and transfers to the opposite column a sufficient additional pressure to raise the inner piston, the valve being automatically operated, as hereinbefore specified. By this means I provide what I call an "artificial atmospheric pressure" to act upon the water in the pipes. The natural atmospheric pressure will only raise water to the maximum height of thirty-three feet; but by creating a high atmospheric pressure in the air-chambers and establishing the intermittent action of the pistons and water-columns, hereinbefore described, I am able to raise water continuously through a siphon-pipe of unlimited height.

Having thus described my invention, what I claim, and desire to secure by Letters Patent, is—

1. The siphon-pipe A, connected at the suction end with the chambers B C, provided with the valves K L, an atmospheric-pressure pump having a piston interposed between it and the chambers B C, and connections therefrom to the valves, said pump being connected with the water-supply by a suction-pipe, F, through which water is raised by the action and reaction of the column of water in the siphon-pipe, substantially as described.

2. The method of transferring water from one leg to the other of a siphon-pipe of unlimited height, consisting in balancing the water in the pipe between two bodies of compressed air, and then producing an action and reaction of the water in the pipe by intermittently discharging a portion of the water at the lower end of the outer or longer leg of the siphon, so as to relieve the pressure first upon one and then upon the other body of air, substantially as described.

3. In a pump, the air-chamber D, connected with the upper chamber, B, by means of the neck or cylinder H, and having the tube $h$ extending up into it from the lower chamber, C, in combination with the inverted-cup-shaped piston E, substantially as above specified.

4. In a pump, the air-chamber D, connected with two water-chambers, B C, by independent passages, in combination with a piston, E, which is arranged to receive a pressure from either or both water-chambers, substantially as described.

5. In a pump having an air-chamber, D, connected with two water-chambers by independent passages and separated therefrom by a piston, E, the valve L, operated by the movement of the piston E by means of the pivoted lever M, rod $o$, and sliding rod, substantially as and for the purpose described.

6. The improvement in valves to be operated under high pressure, consisting in providing a movable valve-seat, $b$, which moves between a fixed valve-seat, $d$, and the valve K', so that when the movable valve-seat is raised the passage is closed by the valve K' dropping upon the seat and opened by the seat dropping below the valve upon the fixed seat, substantially as above described.

7. The upper valve, K, with its guide-spindle $i$, and having the tube $m$ projecting downward from its center, and the lower valve, L, with its short spindle $q$, arranged to drop upon a cross-bar, $q'$, and having the rod $s$ extending upward into the tube $m$ of the upper valve, the motion of the rod in the tube being limited by the key $u$, moving in a slot in the tube, in combination with the upper movable valve-seat, $b$, with its downward-projecting bar $a'$, the lower end of which clasps around and moves along the tube $m$, and is connected with toggle-levers $e'$, and trip-bar $d'$, and the interposed spring $b'$, and the lower movable valve-seat, connected by the arms $f'$ and cross-bar $g'$ with the toggle-levers $n'$ $p'$, and the spring $h'$, interposed between the lower end of the tube $m$ and the cross-bar $q'$, the whole operated by the lever M from the motion of the piston E, substantially as above described.

8. In a pump in which water is admitted under pressure from above into two chambers, B' and C', and the water in the lower chamber is cut off from the upper chamber and discharged therefrom, the combination of movable valve-seats and movable valves, as described, whereby the valve is opened to discharge the water downward by dropping the valve-seats away from the valves and closed by dropping the valves upon the movable valve-seats after they have been raised to an intermediate position, substantially as described.

Witness my hand and seal.

JOHN PATTEN. [L. S.]

Witnesses:
EDWARD E. OSBORN,
W. F. CLARK.